United States Patent [19]
Kolm

[11] 3,796,287
[45] Mar. 12, 1974

[54] SURGE-ACTUATOR FOR BRAKE SYSTEM
[75] Inventor: Richard H. Kolm, Waukesha, Wis.
[73] Assignee: Kelsey-Hayes Company, Romulus, Mich.
[22] Filed: Mar. 16, 1972
[21] Appl. No.: 235,337

[52] U.S. Cl. ............................................. 188/112
[51] Int. Cl............................................... B60t 7/20
[58] Field of Search............................ 188/112, 142

[56] References Cited
UNITED STATES PATENTS
2,354,268   7/1944   McNamara......................... 188/112
2,642,961   6/1953   Teal..................................... 188/112
2,916,107   12/1959  Huentelman........................ 188/112

Primary Examiner—Duane A. Reger
Attorney, Agent, or Firm—Harness, Dickey & Pierce

[57] ABSTRACT

A surge type brake actuator for actuating hydraulically actuated brakes on a towed vehicle and including apparatus for providing a force multiplication whereby an increased fluid pressure output can be obtained particularly for disk brake actuation. The force multiplication apparatus includes a toggle linkage system and a cam that actuates the joint of the toggle linkage. Furthermore, a shock absorber is interposed in the apparatus for providing a smoother brake operation.

5 Claims, 5 Drawing Figures

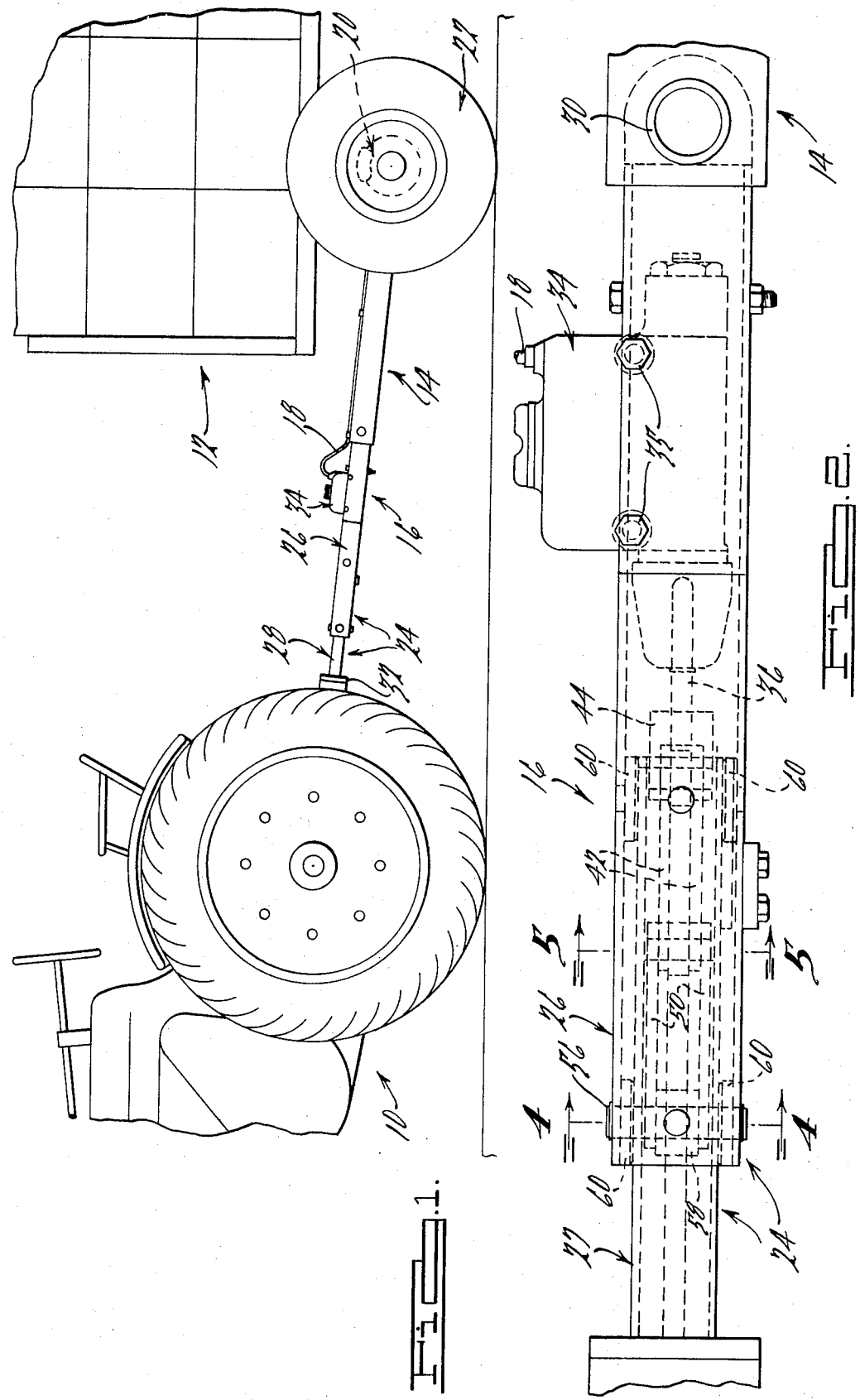

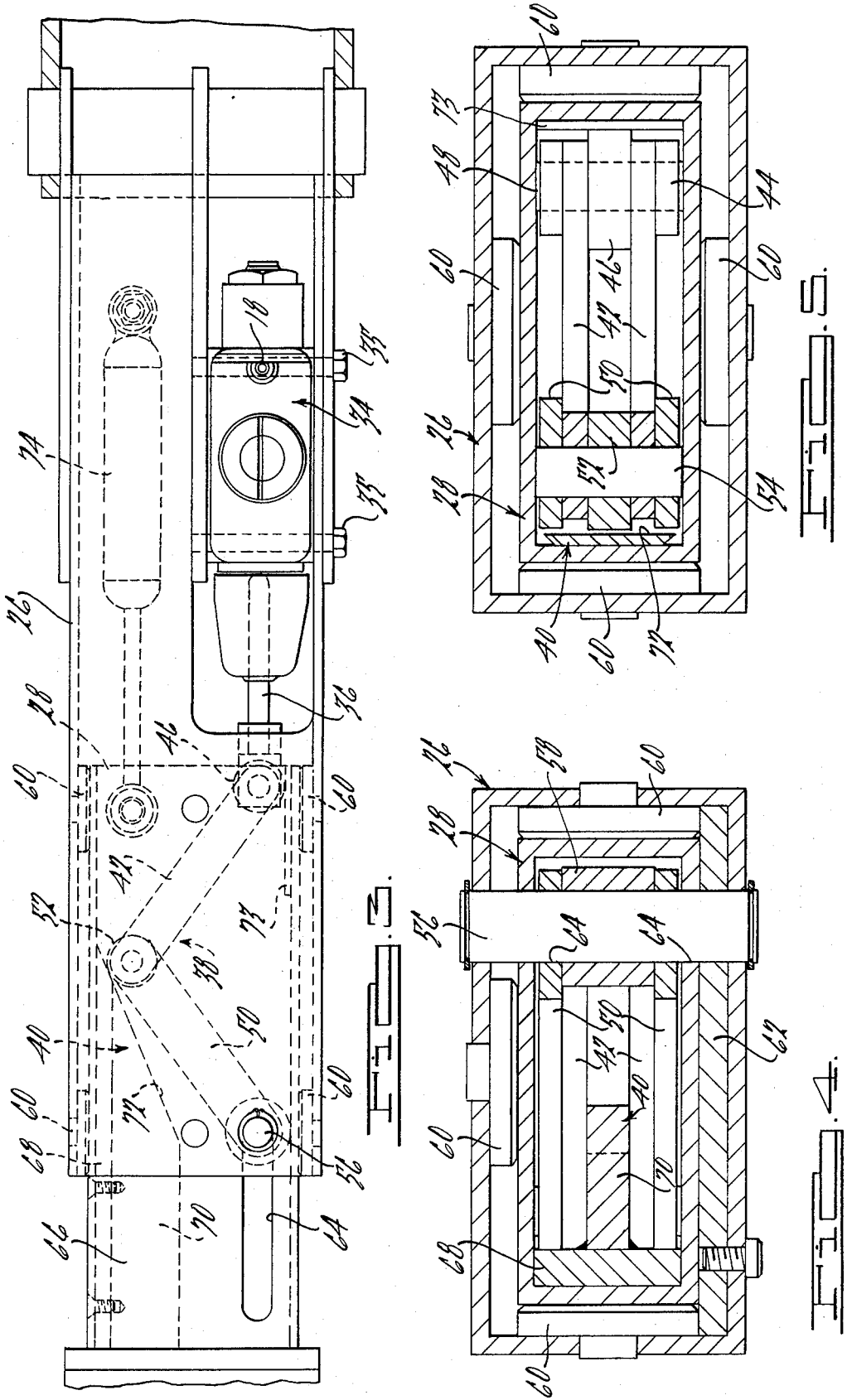

SURGE-ACTUATOR FOR BRAKE SYSTEM

SUMMARY - BACKGROUND OF THE INVENTION

The present invention relates to surge type brake actuators for actuating hydraulic brakes on a towed vehicle.

For towed vehicles, such as trailers, it is common to provide a self contained hydraulic brake system which operates independently of the brake system on the towing vehicle. This has been accomplished by use of a surge actuator which is built into the tongue of the towed vehicle in a manner such that when the towing vehicle is braked, the resultant force on the tongue will be utilized to create a fluid pressure used to actuate the trailer brakes. There are practical limitations on the maximum fluid pressure attainable with conventional surge actuators. This factor becomes especially significant when the actuator is used with disk brakes. In the present invention this problem is solved by utilizing an actuating structure in the surge actuator which provides a desired force multiplication. In addition, in the present invention the rate of application of fluid pressure can be selectively varied over the range of expected tongue loads to optimize braking effect.

Therefore, it is an object to provide a novel surge actuator providing for increased output fluid pressure in response to normal braking forces on the actuator.

It is another object of the present invention to provide a novel surge actuator utilizing force multiplying structure.

It is still another object of the present invention to provide a novel surge actuator for use with disk brakes.

It is another object of the present invention to provide a novel surge actuator in which the response to input force can be selectively varied to optimize braking.

Other objects, features, and advantages of the present invention will become apparent from the subsequent description and the appended claims, taken in conjunction with the accompanying drawings, in which:

FIG. 1 is a pictorial view of an assembly of a tractor and trailer with the trailer including a surge actuator embodying features of the present invention;

FIG. 2 is an enlarged side elevational view of the surge actuator of FIG. 1;

FIG. 3 is a top elevational view of the apparatus of FIG. 2; and

FIGS. 4 and 5 are sectional views taken along the lines 4—4 and 5—5 in FIG. 3.

Looking now to FIG. 1 a tractor 10 is shown towing a trailer 12 via a conventional hitch located in a tongue assembly 14, which assembly 14 includes a surge actuator assembly 16 embodying features of the present invention. The surge actuator assembly 16 has a hydraulic outlet line 18 connected to an actuating cylinder for a disk brake assembly 20 connected with a wheel assembly 22. When the tractor 10 is braked the force on the surge actuator assembly 16, via the tongue assembly 14, is utilized to provide a hydraulic fluid pressure output to energize the disk brakes 20.

The surge actuator assembly 16 includes a telescoping housing assembly 24 connected intermediate the ends of the tongue assembly 14 and has an outer member 26 connected to one portion and an inner member 28 connected to another portion of tongue assembly 14.

The outer member 26 is provided with a transverse tube 30 which is adapted to receive a pin whereby the outer member 26 can be secured to the tongue assembly 14. The inner member 28 can be connected to assembly 14 via a flange 32.

Looking now to FIGS. 2–5, the outer member 26 has a master cylinder (and reservoir) assembly 34 mounted thereon (via bolts 35) with fluid line 18 connected to the outlet thereof. The master cylinder assembly 34 can be of a conventional construction which is actuated to provide a fluid pressure output in response to the force applied to an actuating plunger 36. The plunger 36 is connected to and actuated by a linkage 38 and cam 40.

The linkage 38 includes a first pair of arms 42 pivotally connected at one end to a yoke 44 which is secured to actuating plunger 36. A roller 46 is located between arms 42 and roller 46 and arms 42 are pivotally supported on yoke 44 via a pin 48.

The arms 42 are pivotally connected at their opposite ends to one end of a second pair of arms 50 which are located outboard of arms 42. A second roller 52 is supported between arms 42 and roller 52, arms 50, and arms 42 are all pivotally or rotatably connected together via a pin 54. The opposite ends of arms 50 are pivotally connected to the forward end of the outer housing 26 via a stationary pin 56. A bushing 58 spaces the opposite ends of arms 50 the proper amount to maintain parallelism.

The outer and inner members 26 and 28, respectively, are of generally rectangular tubular construction with the inner member 28 slidably supported within the forward end of the outer member 26. The inner member 28 is slidably supported on a plurality of wear pads 60 and a wear plate 62, all of which have good bearing and wear characteristics. The inner member 28 has slots 64 on opposite sides, which slots receive the pin 56. Thus in the fully separated position of outer and inner members 26, 28 the slots 64 engage the pin 56 and hold members 26, 28 together whereby the pulling force in towing the trailer 12 will be taken by the pin 56. During braking of the tractor 10, however, the inner member 28 will slide inwardly into outer member 26, as permitted by slots 64. A cam plate structure 66 is fixed to one interior side of the inner member 28 such as to be located proximate the interconnection of arms 42 and 50. The structure 66 is generally T-shaped in cross section and includes a flat base 68 and a flat leg member 70. The leg member 70 (and end of base 68) is provided with an inclined, cam surface 72 which is normally located in confrontation with the roller 52. Thus as the inner member 28 telescopes into the outer member 26 during braking, the cam surface 72 engages roller 52 to actuate the linkage assembly 38. A wear plate 73 is located on the interior, confronting side of inner member 28 such as to provide a good wear surface for roller 46. The linkage assembly 38 provides a toggling action which in combination with the inclined cam and roller effect of cam surface 72 and roller 52 will provide for a substantial, determinable mechanical advantage which, in response to the input force on tongue assembly 14, provides a resultant increased force on the master cylinder assembly 34 via the plunger 36. The result is a multiplication of the effect of the force applied to the surge actuator assembly 16 via the tongue assembly 14 with a resultant multiplication of output fluid pressure. This structure provides the necessary pressure capability for the disk brake assembly 20.

A shock absorber 74 has one end connected to outer member 26 and the other end to inner member 28 and acts to dampen the effect of sudden sharp loads on the tongue assembly 14 and hence helps to provide for smoother braking effect.

Note that the cam surface 72 can be made to a variety of contours and hence can be readily constructed in a manner to provide a desired braking effect.

Thus the surge actuator of the present invention not only provides a construction for maximizing the utilization of the force available at the tongue of the trailer but also provides a structure which lends itself to optimized braking via cam surface selection.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. In a vehicle adapted to be towed by a towing vehicle with the towed vehicle having hydraulically actuated brakes actuated by a system independent of the brake system of the towing vehicle and with the towed vehicle having a tongue assembly adapted to be connected to the towing vehicle the improvement comprising: surge actuator means mounted in the tongue assembly and actuable in response to a compressive force on the tongue assembly for actuating the towed vehicle brakes, said surge actuator means comprising a pair of housing members, connecting means for connecting said pair of housing members for limited relative movement therebetween, a master cylinder assembly supported on one of said housing members and connected to the towed vehicle brake system for providing fluid pressure thereto with the magnitude of fluid pressure varying in accordance with the magnitude of an input force, a pair of linkage members connected together at one end in a toggle arrangement, the opposite end of one of said linkage members connected to one of said housing members, the opposite end of the other of said linkage members connected to said master cylinder assembly for providing said input force, and actuating means connected to said housing member and to said linkage members for actuating said linkage members to provide said input force as an increased multiple of the compressive force.

2. The apparatus of claim 1 with said actuating means comprising a cam member and a roller.

3. The apparatus of claim 2 with said cam member being connected to one of said housing members and with said linkage members being connected to the other one of said housing members, said roller being rotatably secured at the connection between said pair of linkage members.

4. The apparatus of claim 3 including another roller member rotatably connected to said opposite end of said other of said linkage member, and means pivotably supporting said opposite end of said one linkage member to said other one of said housing members.

5. The apparatus of claim 4 further comprising shock absorber means connected between said housing members for dampening the relative motion therebetween.

* * * * *